(12) United States Patent
Matsumura et al.

(10) Patent No.: US 11,639,400 B2
(45) Date of Patent: May 2, 2023

(54) ACTIVE ENERGY RAY CURABLE LIQUID, METHOD OF MANUFACTURING FABRICATION OBJECT, RESIN FABRICATION OBJECT, AND GEL FABRICATION OBJECT

(71) Applicant: RICOH COMPANY, LTD., Tokyo (JP)

(72) Inventors: Takashi Matsumura, Kanagawa (JP); Tatsuya Niimi, Kanagawa (JP); Takuya Saito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 85 days.

(21) Appl. No.: 16/546,818

(22) Filed: Aug. 21, 2019

(65) Prior Publication Data

US 2020/0071432 A1    Mar. 5, 2020

(30) Foreign Application Priority Data

Aug. 30, 2018  (JP) .............................. JP2018-160959

(51) Int. Cl.
| | |
|---|---|
| *B29C 64/188* | (2017.01) |
| *C08F 20/06* | (2006.01) |
| *B29C 64/264* | (2017.01) |
| *B29C 64/129* | (2017.01) |
| *B33Y 10/00* | (2015.01) |
| *B33Y 70/00* | (2020.01) |

(52) U.S. Cl.
CPC ............ *C08F 20/06* (2013.01); *B29C 64/129* (2017.08); *B29C 64/188* (2017.08); *B29C 64/264* (2017.08); *B33Y 10/00* (2014.12); *B33Y 70/00* (2014.12)

(58) Field of Classification Search
None
See application file for complete search history.

(56) References Cited

U.S. PATENT DOCUMENTS

| | | | |
|---|---|---|---|
| 4,043,819 A | 8/1977 | Baumann | |
| 6,750,262 B1 * | 6/2004 | Hahnle | A61L 15/24 521/64 |
| 2004/0057986 A1 | 3/2004 | Merrigan et al. | |
| 2005/0218549 A1 * | 10/2005 | Farr | B29C 64/165 264/109 |
| 2016/0115297 A1 | 4/2016 | Norikane et al. | |
| 2016/0244594 A1 | 8/2016 | Langlotz | |
| 2016/0275818 A1 | 9/2016 | Norikane et al. | |
| 2017/0008228 A1 | 1/2017 | Iwata et al. | |

(Continued)

FOREIGN PATENT DOCUMENTS

| | | | |
|---|---|---|---|
| EP | 0 302 829 | 2/1989 | |
| GB | 1171812 A * | 11/1969 | ............... C08F 20/62 |

(Continued)

OTHER PUBLICATIONS

Japanese Office Action dated Jun. 7, 2022, in Japanese Patent Application No. 2018-160959, 3 pages.

(Continued)

*Primary Examiner* — Timothy Kennedy
(74) *Attorney, Agent, or Firm* — Grüneberg and Myers, PLLC

(57) ABSTRACT

An active energy ray curable liquid contains an unsaturated acid monomer and a metal salt.

25 Claims, 1 Drawing Sheet

(56) References Cited

U.S. PATENT DOCUMENTS

| | | |
|---|---|---|
| 2017/0022348 A1 | 1/2017 | Iwata et al. |
| 2017/0239886 A1 | 8/2017 | Norikane |
| 2017/0258556 A1 | 9/2017 | Watanabe et al. |
| 2017/0270831 A1 | 9/2017 | Norikane et al. |
| 2017/0326645 A1 | 11/2017 | Saito et al. |
| 2017/0355133 A1 | 12/2017 | Shimada et al. |
| 2017/0369607 A1 | 12/2017 | Iwata et al. |
| 2018/0001520 A1 | 1/2018 | Saito et al. |
| 2018/0061279 A1 | 3/2018 | Niimi et al. |
| 2018/0126651 A1 | 5/2018 | Matsumura et al. |
| 2018/0345036 A1 | 12/2018 | Niimi et al. |
| 2018/0345574 A1 | 12/2018 | Matsumura et al. |
| 2019/0010259 A1 | 1/2019 | Iwata et al. |
| 2019/0241684 A1* | 8/2019 | Tsujino ................. B33Y 10/00 |

FOREIGN PATENT DOCUMENTS

| | | | | |
|---|---|---|---|---|
| JP | S51-11433 | 1/1976 | | |
| JP | S64-59289 | 1/1976 | | |
| JP | S64-83579 | 3/1989 | | |
| JP | H09-040837 | 2/1997 | | |
| JP | 2002-538254 | 11/2002 | | |
| JP | 2004-525226 | 8/2004 | | |
| JP | 2006-45354 | 2/2006 | | |
| JP | 2007-56128 | 3/2007 | | |
| JP | 2015-136895 | 7/2015 | | |
| JP | 2015-138192 | 7/2015 | | |
| JP | 2015-227057 | 12/2015 | | |
| JP | 2018-53043 | 4/2018 | | |
| WO | 2011/078167 | 6/2011 | | |
| WO | 2012/069642 | 5/2012 | | |
| WO | WO2016/121587 A1 | 8/2016 | | |
| WO | WO-2018043582 A1 * | 3/2018 | ............. | B29C 64/40 |
| WO | 2018/095823 | 5/2018 | | |
| WO | WO-2019172509 A1 * | 9/2019 | ................ | C08J 3/24 |

OTHER PUBLICATIONS

Japanese Office Action dated Oct. 25, 2022, in Japanese Patent Application No. 2018-160959, 4 pages.

* cited by examiner

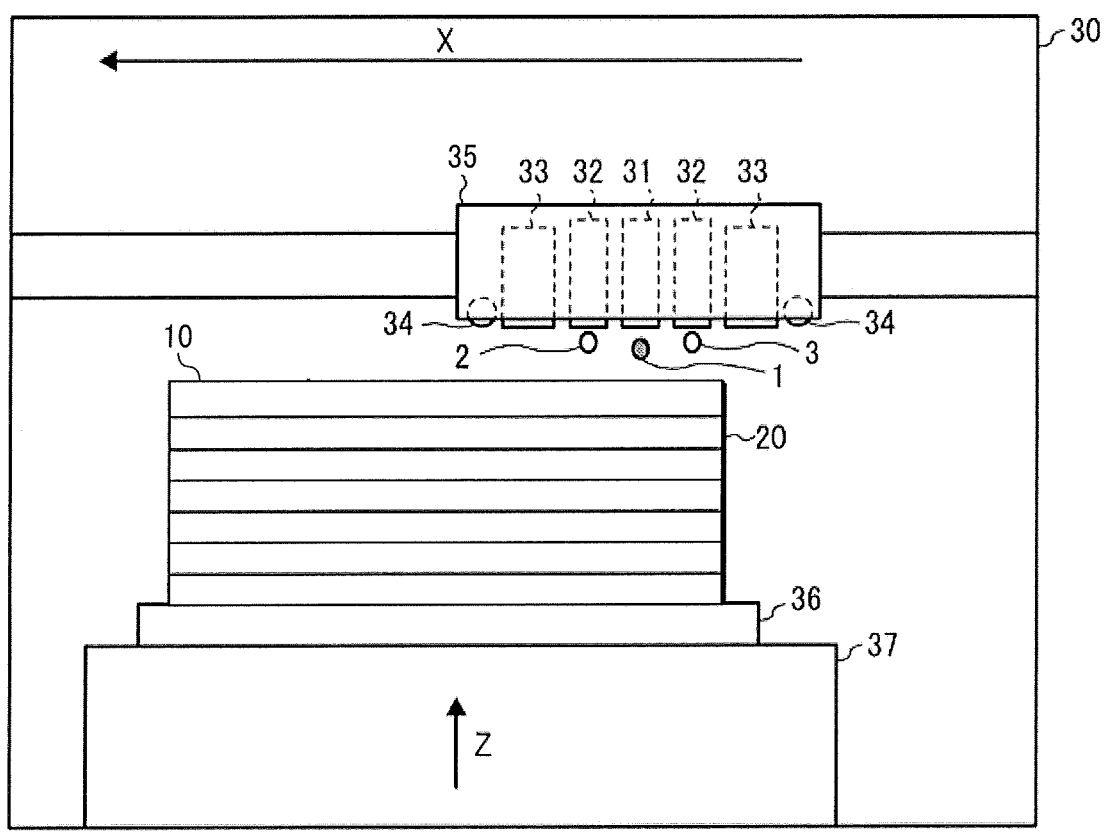

ACTIVE ENERGY RAY CURABLE LIQUID, METHOD OF MANUFACTURING FABRICATION OBJECT, RESIN FABRICATION OBJECT, AND GEL FABRICATION OBJECT

CROSS-REFERENCE TO RELATED APPLICATIONS

This patent application is based on and claims priority pursuant to 35 U.S.C. § 119 to Japanese Patent Application No. 2018-160959, filed on Aug. 30, 2018 in the Japan Patent Office, the entire disclosure of which is hereby incorporated by reference herein.

BACKGROUND

Technical Field

The present invention relates to active energy ray curable liquid, a method of manufacturing a fabrication object, a resin fabrication object, and a gel fabrication object.

Description of the Related Art

In the stereolithography of irradiating with active energy rays to fabricate a solid freeform fabrication object, a photocurable liquid resin is irradiated layer by layer with laser beams or ultraviolet rays to fabricate a three-dimensional fabrication object.

The material jetting method has been proposed in which an image is formed on a required position with a photocurable liquid resin by an inkjet method and laminated to form a three-dimensional fabrication object.

In addition, a method of fabricating a solid freeform fabrication object has been proposed in which a film is formed by applying a liquid containing a hydrogel precursor containing water and a mineral and a polymerizable monomer dispersible in water, cured, and laminated by repeating film-forming and curing.

SUMMARY

According to embodiments of the present disclosure, provided is an active energy ray curable liquid which contains an unsaturated acid monomer and a metal salt.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawing, which is intended to depict example embodiments of the present invention and should not be interpreted to limit the scope thereof. The accompanying drawing is not to be considered as drawn to scale unless explicitly noted.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, provided is active energy ray curable liquid which contributes to manufacturing of a fabrication object having excellent breaking stress and elongation ratio.

Active Energy Ray Curable Ink

According to a first embodiment of the present disclosure, the active energy ray curable liquid contains an unsaturated acid monomer, a metal salt, preferably a polymerizable monomer, and other optional components.

According to a second embodiment of the present disclosure, the active energy ray curable liquid contains an unsaturated acid monomer, a metal salt, a solvent, and other optional components.

Typically, fabrication objects formed with active energy ray curable liquid for resin fabrication or gel fabrication have poor strength and inferior tensile strength and tensile fracture strain. Therefore, for example, when an object having a gear-like form is fabricated as a resin fabrication object, chipping tends to occur if the object is actually incorporated in the device as a gear. In addition, when an organ model is fabricated to improve the ability of the procedure of a surgeon, it is impossible to reproduce a strong portion such as a heart and difficult to make texture or bite closer to the real thing.

Therefore, in the present disclosure, the active energy ray curable liquid containing an unsaturated acid monomer and a metal salt or the active energy ray curable liquid containing an unsaturated acid monomer, a metal salt, and a solvent is used to fabricate a fabrication object having a high strength and excellent tensile strength and tensile fracture strain.

Also, the present inventors have found that practically usable ink for inkjet fabrication can be obtained if a first liquid containing an unsaturated acid monomer and a second liquid containing a metal salt and a solvent are separately discharged.

Active Energy Ray Curable Liquid of First Embodiment
The active energy ray curable liquid of the first embodiment contains an unsaturated acid monomer, a metal salt, preferably a polymerizable monomer, and other optional components.

The active energy ray curable liquid of the first embodiment is preferably used as a material for resin fabrication.

As a result of the usage of the active energy ray curable liquid of the first embodiment for resin fabrication, a resin fabrication object having excellent breaking stress and elongation ratio is obtained. For example, in the case of fabrication of a gear-like form, it is possible to manufacture a strong gear free of chipping when actually incorporated in a device as a gear.

Unsaturated Acid Monomer

The unsaturated acid monomer is not particularly limited and can be suitably selected to suit to a particular application. To obtain a fabrication object having excellent breaking stress and elongation ratio, the unsaturated acid monomer is acrylic acid, methacrylic acid, (hereinafter, also referred to as (meth)acrylic acid), and/or a derivative thereof.

Specific examples of acrylic acid, methacrylic acid, and/or a derivative thereof include, but are not limited to, unsaturated monocarboxylic acids such as acrylic acid, methacrylic acid, and crotonic acid, monoalkyl esters of unsaturated dicarboxylic acid such as itaconic acid, maleic acid, maleic anhydride, fumaric acid, monoalkyl esters of maleic acid, fumaric acid monoalkyl esters, and itaconic acid monoalkyl esters, an unsaturated dicarboxylic acid such as citraconic acid, phosphoric acid group-containing unsaturated monomers such as acid phosphooxyethyl (meth)acrylate (i.e., acrylate and methacrylate), acid phosphooxy polyoxyethylene glycol mono(meth)acrylate, and acid phosphooxypolyoxy propylene glycol mono(meth)acrylates, 2-(meth)acryloyloxyethyl succinic acid, β-carboxyethyl(meth)acrylate, monohydroxyethyl (meth)acrylate phthalate, (meth)acryloyloxyethyl succinate, 2-propenoic acid, vinyl sulfonic acid, (meth)allyl sulfonic acid, 2-(meth)acrylamide-2-methylpropane sulfonic acid α-methylstyrene sulfonic acid, 2-(meth)acryloyloxyethyl phthalic acid, 3-(2-carboxyethoxy)-3-oxy propyl ester, 2-(meth)acryloyloxyethyl tetrahydrophthalic acid, 2-(meth)acryloyloxyethyl hexahydrophthalic acid, ω-carboxy-polycaprolactone (n=2) mono(meth)acrylate, glycerin mono(meth)acrylate, hydroxymethyl(meth)acrylate, hydroxyethyl(meth)acrylate, hydroxypropyl(meth)acrylate, hydroxybutyl(meth)acrylate, hydroxypentyl(meth)acrylate, hydroxyhexyl(meth)acrylate, hydroxyethyl vinyl ether, diethylene glycol mono vinyl ether, hydroxy butyl vinyl ether, polypropylene glycol mono (meth)acrylate, polyethylene glycol mono(meth)acrylate, and hydroxyethyl acrylamide.

These can be used alone or in combination.

Metal Salt

Metal salt means a generic term for compounds in which the hydrogen atom of an acid is replaced with a metal ion.

The metal salt has no specific limit and can be suitably selected to suit to a particular application. Examples are monovalent metal salts, divalent metal salts and trivalent metal salts. Of these, a divalent or higher multi-valent metal salt is preferable to form a stronger cross-linked structure and obtain a fabrication object having excellent breaking stress and a high elongation ratio.

Examples of the mono-valent metal salt include, but are not limited to, lithium salts, sodium salts, and potassium salts.

Examples of the divalent metal salts include, but are not limited to, calcium salts, magnesium salts, nickel salts, divalent iron salts, copper salts, manganese salts, cobalt salts, zinc salts, cadmium salts, and beryllium salts.

Examples of the trivalent metal salts include, but are not limited to, aluminum salts, trivalent iron salts, gallium salts, neodymium salts, gadolinium salts, and cerium salts.

The metal salt is preferably ionic.

Specific examples of the metal ion constituting the metal salt include, but are not limited to, alkali metal ions such as $Li^+$, $Na^+$, and $K^+$, alkaline earth metal ions such as $Be^{2+}$, $Mg^{2+}$, and $Ca^{2+}$, transition metal ions such as $Cu^{2+}$, $Fe^{3+}$, $Ni^{2+}$, $Mn^{2+}$, and $Co^{2+}$, base metal ions such as $Al^{3+}$, $Ga^{3+}$, $Zn^{2+}$, and $Cd^{2+}$, and lanthanoid ions such as $Nd^{3+}$, $Gd^{3+}$, and $Ce^{3+}$.

A specific example of the divalent iron salt is iron (II) chloride.

Specific examples of the calcium salt include, but are not limited to, calcium nitrate, calcium chloride, and calcium acetate.

Specific examples of the magnesium salt include, but are not limited to, magnesium chloride, magnesium acetate, magnesium sulfate, and magnesium nitrate.

A specific example of the nickel salt is nickel chloride.

A specific example of the aluminum salt is aluminum nitrate.

These can be used alone or in combination. Moreover, these may be anhydrides or may be hydrates.

The unsaturated acid monomer and the metal salt can be independently and separately added, but they can be used as the unsaturated acid metal salt monomer obtained by reacting the unsaturated acid monomer with the metal ion obtained by ionizing the metal salt, which is preferable in terms of ink stability and polymerization stability.

As the unsaturated metal salt monomer, any suitably synthesized articles or products available on the market can be used.

Specific examples of the commercially available product include, but are not limited to, potassium acrylate (manufactured by Nippon Shokubai Co., Ltd.), zinc acrylate (manufactured by Nippon Shokubai Co., Ltd.), potassium methacrylate (manufactured by Nippon Shokubai Co., Ltd.), magnesium acrylate (manufactured by Asada Chemical INDUSTRY Co., Ltd.), calcium acrylate (manufactured by Asada Chemical INDUSTRY Co., Ltd.), zinc methacrylate (manufactured by Asada Chemical INDUSTRY Co., Ltd.), magnesium methacrylate (manufactured by Asada Chemical INDUSTRY Co., Ltd.), aluminum acrylate (manufactured by Asada Chemical Industry Co., Ltd.), neodymium methacrylate (manufactured by Asada Chemical INDUSTRY Co., Ltd.), and sodium methacrylate (manufactured by Asada Chemical INDUSTRY Co., Ltd.), and potassium acrylate (manufactured by Asada Chemical INDUSTRY Co., Ltd.).

Due to this polymerization of such an unsaturated acid monomer and a metal salt or an unsaturated acid metal salt monomer, it is possible to obtain an extremely tough fabrication object in which polymers are ion cross-linked.

When the unsaturated acid monomer and the metal salt or the unsaturated acid metal salt monomer are used alone, the proportion of the unsaturated acid metal salt monomer in the active energy ray curable liquid is preferably from 50 to 95 percent by mass and more preferably from 70 to 90 percent by mass.

In the active energy ray curable liquid, the unsaturated acid metal salt monomer may be used alone or may be copolymerized with a polymerizable monomer. Due to the copolymerization of the unsaturated acid metal salt monomer and the polymerizable monomer, it is possible to obtain a tougher fabrication object reflecting properties of the polymerizable monomer.

When the unsaturated acid metal salt monomer and the polymerizable monomer are copolymerized, the proportion of the unsaturated acid metal salt monomer in the active energy ray curable liquid is preferably from 5 to 50 percent by mass and more preferably from 20 to 40 percent by mass.

Polymerizable Monomer

The polymerizable monomer includes a mono-functional monomer and a multi-functional monomer.

Mono-Functional Monomer

Examples of the mono-functional monomer include, but are not limited to, (meth)acrylamide derivatives such as acrylamide, methacrylamide, N-substituted acrylamide derivative, N,N-di-substituted acrylamide derivative, N-substituted methacrylamide derivative, N,N-di-substituted methacrylamide derivative, and other mono-functional monomers. These can be used alone or in combination.

Specific examples of (meth)acrylamide derivatives include, but are not limited to, N, N-dimethyl acrylamide, N-isopropyl acrylamide, N-methylol acrylamide, acryloyl morpholine, dimethyl methacrylamide, N-isopropyl methacrylamide, N-methylol methacrylamide, and methacryloyl morpholine. These can be used alone or in combination. Of these, acryloyl morpholine and N, N-dimethyl acrylamide are preferable in terms of polymerization stability.

The other mono-functional monomers include, but are not limited to, acrylates, alkyl acrylates, methacrylates, and alkyl methacrylates.

Specific examples of the acrylate include, but are not limited to, hydroxyethyl acrylate, hydroxypropyl acrylate, dimethylaminoethyl acrylate, dimethylaminopropyl acrylate, and alkyl acrylate.

Specific examples of the alkyl acrylate include, but are not limited to, methyl acrylate, ethyl acrylate, butyl acrylate, and 2-ethylhexyl acrylate lauryl acrylate.

Specific examples of the methacrylate include, but are not limited to, hydroxyethyl methacrylate, hydroxypropyl methacrylate, dimethylaminoethyl methacrylate, dimethylaminopropyl methacrylate, and alkyl methacrylate.

Specific examples of the alkyl methacrylate include, but are not limited to, methyl methacrylate, ethyl methacrylate, butyl methacrylate, lauryl methacrylate, stearyl methacrylate, and glycidyl methacrylate.

Specific examples of the other mono-functional monomers include, but are not limited to, 2-etylhexyl(meth)acrylate (EHA), 2-hydroxyethyl(meth)acrylate (HEA), 2-hydroxypropyl(meth)acrylate (HPA), caprolactone-modified tetrahydrofurfuryl(meta)acrylate, isobonyl(meth)acrylate, 3-methoxybutyl(meth)acrylate, tetrahydro furfuryl (meth)acrylate, lauryl(meth)acrylate, 2-phenoxyethyl (meth)acrylate, isodecyl (meth)acrylate, isooctyl(meth)acrylate, tridecyl(meth)acrylate, caprolactone(meth)acrylate, and ethoxyfied nonylphenol(meth)acrylate. These can be used alone or in combination.

Multi-Functional Monomer

The multi-functional monomer includes difunctional monomers or tri- or higher functional monomers.

Specific examples of the di-functional monomer include, but are not limited to, tripropylene glycol di(meth)acrylate, triethylene glycol di(meth)acrylate, tetraethylene glycol di(meth)acrylate, polypropylene glycol di(meth)acrylate, neopentyl glycol hydroxy pivalic acid ester di(meth)acrylate (MANDA), hydroxypivalic acid neopentyl glycol ester di(meth)acrylate (HPNDA), 1,3-butane diol di(meth)acrylate (BGDA), 1,4-butane diol di(meth)acrylate (BUDA), 1,6-hexane diol di(meth)acrylate (HDDA), 1,9-nonane diol (meth)acrylate, diethylene glycol di(meth)acrylate (DEGDA), neopentyl glycol di(meth)acrylate (NPGDA), tripropylene glycol di(meth)acrylate (TPGDA), caprolactone-modified hydroxy pivalic acid neopentyl glycol ester di(meth)acrylate, propoxinated neopentyl glycol di(meth) acrylate, ethoxy-modified bisphenol A di(meth)acrylate, polyethylene glycol 200 di(meth)acrylate, and polyethylene glycol 400 di(meth)acrylate. These can be used alone or in combination.

Specific examples of the tri- or higher functional monomers include, but are not limited to, trimethylol propane tri(meth)acrylate (TMPTA), pentaerythritol tri(meth)acrylate (PETA), dipentaerythritol hexa(meth)acrylate (DPHA), triallyl isocyanate, (meth)acrylate of ε-caprolactone modified dipentaerythritol, tris(2-hydroxyethyl)isocyanulate tri (meth)acrylate, ethoxified trimethylol propane tri(meth) acrylate, propoxified trimethylol propane tri(meth)acrylate, propoxified glyceryl tri(meth)acrylate, pentaerythritol tetra (meth)acrylate, ditreimethylhol propanetetra(meth)acrylate, dipentaerythritol hydroxypenta(meth)acrylate, ethoxified (pentaerythritol tetra(meth)acrylate, and penta(meth)acrylate ester. These can be used alone or in combination.

The proportion of the polymerizable monomer in the total amount of the active energy ray curable liquid is preferably from 10 to 80 percent by mass and more preferably from 30 to 60 percent by mass.

Other Optional Components

The other optional components have no particular limit and can be suitably selected to suit to a particular application. For example, stabilizers, surface treatment chemicals, polymerization initiators, coloring materials, viscosity modifiers, adhesion imparting agents, antioxidants, anti-aging agents, cross-linking promoters, ultraviolet absorbents, plasticizers, preservatives, and dispersants.

Stabilizer

Stabilizers are optionally used to stabilize properties as liquid. Stabilizers include, for example, highly concentrated phosphates, glycols, and non-union surfactants.

Surface Treatment Chemical

Specific examples of the surface treatment chemical include, but are not limited to, a polyester resin, a polyvinyl acetate resin, a silicone resin, a coumarone resin, an ester of aliphatic acids, glyceride, and wax.

Polymerization Initiator

Examples of the polymerization initiator include, but are not limited to, thermal polymerization initiators and photopolymerization initiators. Of these, storage stability, and inkjet method, processes of fabrication by stereo lithography, photopolymerization initiators are preferable.

As the photopolymerization initiator, any material can be used which produces a radical upon irradiation of light (ultraviolet rays in a wavelength range of from 220 to 500 nm).

Specific examples of the photopolymerization initiator include, but are not limited to, acetophenone, 2,2-diethoxyacetophenone, p-dimethylaminoacetophenone, benzophenone, 2-chlorobenzophenone, p,p'-dichlorobenzophenone, p,p-bisdiethylamonobenzophenone, Michler's Ketone, benzyl, benzoin, benzoin methylether, benzoin ethylether, benzoin isopropylether, benzoin-n-propylether, benzoin isobutylether, benzoin-n-butylether, benzylmethyl ketal, thioxanthone, 2-chlorothioxanthone, 2-hydroxy-2-methyl-1l-phenyl-1-one, 1-(4-isopropylphenyl)-2-hydroxy-2-methylpropane-1-one, methylbenzoyl formate, 1-hydroxy cyclohexyl phenylketone, azobisisobutylonitrile, benzoylperoxide, and di-tert-butylperoxide. These can be used alone or in combination.

The thermal polymerization initiator has no particular limitation and can be suitably selected to suit to a particular application. Examples thereof are azo-based initiators, peroxide initiators, persulfate initiators, and redox (oxidation-reduction) initiators.

Azo-based initiators are available on the market.

Specific example of the commercial products include, but are not limited to, VA-044, VA-46B, VA-50, VA-057, VA-061, VA-067, VA-086, 2,2'-azobis(4-methoxy-2,4-dimethylvaleronitrile) (VAZO® 33), 2,2'-azobis(2-amidinopropane)dihydrochloride (VAZO® 50), 2,2'-azobis(2,4-dimetaylvaleronitrile) (VAZO® 52), 2,2'-azobis(isobutylonitrile) (VAZO® 64), 2,2'-azobis-2-methylbutylonitrile) (VAZO® 67), and 1,1-azobis(1-cyclohexane carbonitrile) (VAZO® 88) (all available from E.I. du Pont de Nemours and Company), 2,2'-azobis(2-cyclopropylpropionitrile), and 2,2'-azobis(methylisobutylate) (V-601) (all available from FUJIFILM Wako Pure Chemical Corporation).

Specific examples of the peroxide initiator include, but are not limited to, benzoyl peroxide, acetyl peroxide, lauroyl peroxide, decanoyl peroxide, dicetyl peroxy dicarbonate, di(4-t-butylcyclohexyl)peroxy dicarbonate (Perkadox® 16S) (available from Akzo Nobel N.V.), di(2-ethylhexyl) peroxy dicarbonate, t-butyl peroxypivalate (Lupersol® 11) (all available from ElfAtochem S.A), t-butylperoxy-2-ethyl hexanoate (Trigonox® 21-C50) (available from Akzo Nobel N.V.), and dicumyl peroxide.

Specific examples of the persulfate initiator include, but are not limited to, potassium persulfate, sodium persulfate, and ammonium persulfate.

Specific examples of redox (oxidation-reduction) initiator include, but are not limited to, a combination of the persulfate initiator and a reducing agent such as sodium metabisulfite and sodium bisulfite, a system based on the organic peroxide and tertiary amine (such as a system based on benzoyl peroxide and dimethylaniline), and a system based on organic hydroperoxide and transition metal (such as a system based on cumenhydroperoxide and cobalt naftate).

Coloring Material

As the coloring agent, various pigments and dyes can be used, which impart black, white, magenta, cyan, yellow, green, orange, and gloss color such as gold and silver.

As the pigment, an inorganic or organic pigment can be used alone or in combination.

Specific examples of the inorganic pigment include, but are not limited to, carbon blacks (C.I. Pigment Black 7) such as furnace black, lamp black, acetylene black, and channel black, iron oxides, and titanium oxides.

Specific examples of the organic pigment include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxane pigments, thioindigo pigments, isoindolinone pigments, and quinophthalone pigments, dye chelate such as basic dye type chelate and acid dye type chelate, dye lakes such as basic dye type lake and acidic dye type lake, nitro pigments, nitroso pigments, aniline black, and daylight fluorescent pigments.

In addition, a dispersant is optionally added to enhance dispersibility of a pigment. The dispersant has no particular limit. For example, it is suitable to use a polymer dispersant conventionally used to prepare a pigment dispersion.

Examples of the dye include acid dyes, direct dyes, reactive dyes, and basic dyes. These can be used alone or in combination.

Note that when coloring material is used in the material jetting method, a full-color fabrication object can be formed by using each color material having such colors as black, cyan, magenta, yellow and white.

The proportion of the coloring material in the active energy ray curable liquid is not particularly limited and can be suitably determined considering the desired color density, dispersibility in the active energy ray curable liquid. It is preferably from 0.1 to 20 percent by mass.

Preparation of Active Energy Ray Curable Liquid of First Embodiment

The active energy ray curable liquid of the first embodiment can be prepared using the various components mentioned above. The preparation device and conditions are not particularly limited. For example, unsaturated acid monomers, metal salts, polymerizable monomers, and other components are loaded and mixed in a dispersing machine such as a ball mill, a kitty mill, a disc mill, a pin mill, and a Dyno mill to prepare the active energy ray curable liquid of the first embodiment.

Viscosity

Viscosity of the active energy ray curable liquid of the first embodiment is not particularly limited and may be prepared by temperature.

When using an active energy ray curable liquid is used in the material jetting method, viscosity thereof at 25 degrees C. is preferably from 3 to 60 mPa·s and more preferably from 6 to 30 mPa·s. When viscosity is less than 3 mPa·s, discharging may be unstable, for example, the discharging direction curves or the liquid is not discharged during fabrication. When viscosity exceeds 60 mPa·s, the liquid may not be discharged. In addition, viscosity of the active energy ray curable liquid can be adjusted to those ranges by changing the temperature of an inkjet head.

When the active energy ray curable liquid is used in the stereolithography method, viscosity thereof at 25 degrees C. is preferably 50 mPa·s or more, more preferably 100 mPa·s or more, and furthermore preferably 200 mPa·s or more in order to maintain a cured product stable in a fabrication tank. In terms of handling property, it is preferably 20,000 mPa·s or less, more preferably 15,000 mPa·s or less, and furthermore preferably 12,000 mPa·s or less.

In addition, viscosity of the active energy ray curable liquid can be adjusted to those ranges by changing the temperature of the fabrication tank.

Viscosity can be measured by, for example, a rotation viscometer (VISCOMATE VM-150 III, manufactured by TOKI SANGYO CO., LTD.) in a 25 degrees C. environment. Viscosity can be adjusted, for example, by mixing monomers, minerals dispersed in a solvent, or solvents having different viscosities.

Active Energy Ray Curable Liquid of Second Embodiment

The active energy ray curable liquid of the second embodiment contains an unsaturated acid monomer, a metal salt, a solvent, and other optional components.

The active energy ray curable liquid of the second embodiment is preferably used as a material for gel fabrication.

Due to gel fabrication using the active energy ray curable liquid of the second embodiment, for example, an organ model having a strong portion such as a heart can be fabricated and texture and sharpness can be closer to those of a real organ.

As the unsaturated acid monomer, the metal salt, and the other components, the same unsaturated acid monomer, metal salt, and other component as specified for the first embodiment can be used. To stabilize metal ions, pH may be adjusted using a pH regulator.

Specific examples of the pH regulators include, but are not limited to, citric acid, malic acid, and adipic acid.

Like the active energy ray curable liquid of the first embodiment, the unsaturated acid monomer and the metal salt can be added separately in the case of the active energy ray curable liquid of the second embodiment. However, using the unsaturated acid metal salt monomer obtained by reacting the unsaturated acid monomer with the metal ion obtained by ionizing a metal salt is preferable in terms of ink stability and polymerization stability.

The proportion of the unsaturated acid metal salt monomer in the active energy ray curable liquid is preferably from 5 to 50 percent by mass and more preferably from 20 to 40 percent by mass.

Solvent

As the solvent, using a solvent unreactive with the unsaturated acid monomer is preferable. Due to this, the fabrication object after curing with active energy rays can be obtained as a gel.

As the solvent, water and/or an organic solvent is suitably used.

The gel is a fabrication object in which a solvent is taken in a network structure formed of a polymer. When the solvent incorporated is water, it is called "hydrogel", and when it is an organic solvent, it is called "oil gel". The organic solvent is liquid at a normal temperature.

The proportion of the solvent in the total content of the gel is preferably 10 percent by mass or more and more preferably 60 percent by mass or more. In addition, the proportion is preferably 90 percent by mass or less and more preferably 80 percent by mass or less.

Water

Water is used as the main solvent for hydrogels.

There is no specific limitation to the water and it can be suitably selected to suit to a particular application. For example, pure water and ultra pure water such as deionized water, ultrafiltered water, reverse osmosis water, and distilled water are suitable.

It is suitable to dissolve or disperse an organic solvent or other components in the water to impart moisturizing property, antibiotic property, and conductivity and adjust compression stress and modulus of elasticity.

Although water is used as a major solvent for the hydrogel, the oil gel may contain water to obtain desired physical properties. In addition, the hydrogel may contain an organic solvent to obtain desired physical properties.

Organic Solvent

The organic solvent is used as the major solvent of the oil gel.

The organic solvent is not particularly limited and can be suitably selected to suit to a particular application. Specific examples include, but are not limited to, alcohols such as methanol and ethanol, higher alcohols such as oleyl alcohol, dodecanol, stearyl alcohol, hexanol, and hexyldecanol, diols such as glycerin, ethylene glycol, and propylene glycol, amines such as dimethylformamide and dimethylacetamide, ketones such as acetone and methyl ethyl ketone, dimethyl sulfoxide, tetrahydrofuran, benzene, toluene, xylene, acetic acid, ethyl acetate, butyl acetate, and acetic anhydride. These can be used alone or in combination. Of these, solvents having high boiling points such as ethylene glycol and glycerin are preferable in terms of stability of a fabrication object.

Active Energy Ray Curable Liquid Set

The active energy ray curable liquid set has a first liquid containing an unsaturated acid monomer and a second liquid containing a metal salt and a solvent.

It is preferable that the first liquid and/or the second liquid contain a polymerization initiator.

As the polymerization initiator, the same polymerization initiator as those in the active energy ray curable liquid of the first embodiment can be used.

First Liquid

The first liquid contains an unsaturated acid monomer and other optional components.

The same unsaturated acid monomer as in the active energy ray curable liquid of the first embodiment can be used as the unsaturated acid monomer of the first liquid.

As the other components, the same component as specified for the active energy ray curable liquid of the first embodiment can be used.

Second Liquid

The second liquid contains a metal salt, a solvent, and other optional components. The active energy ray curable liquid set using the second liquid is preferably used as a material for gel fabrication.

The metal salt is dispersed in a solvent to prepare a second liquid containing a metal ion in the solvent.

As the metal salt in the second liquid, the same metal salt as in the metal salt in the active energy ray curable liquid of the first embodiment can be used.

The same solvent as in the active energy ray curable liquid of the second embodiment can be used as the solvent in the second liquid.

The same other components as specified for the active energy ray curable liquid can be used as the other component. In order to stabilize the metal ion, it is preferable to adjust the pH with a pH regulator. The pH regulator is not particularly limited and can be suitably selected to suit to a particular application. Specific examples include, but are not limited to, citric acid, malic acid, and adipic acid.

Method of Manufacturing Fabrication Object and Device for Manufacturing Fabrication Object of First Embodiment The method of manufacturing a fabrication object of the first embodiment repeats a liquid film forming process and a liquid film curing process to form a layer, thereby laminating the layers to form a fabrication object, and other optional processes.

The method of manufacturing a fabrication object of the first embodiment is suitably used for resin fabrication in order to obtain a fabrication object having a high breaking stress and high elongation ratio.

In the method of manufacturing a solid freeform fabrication object of the first embodiment, each process is repeated multiple times. The number of the repetition is not simply determined because the number depends on the size, form, structure, etc. of a 3D fabrication object to be manufactured. However, if the thickness per layer is in the range of from 10 to 50 μm, the object can be fabricated with precision free of peeling-off. Therefore, forming a layer is repeated until the thickness of the fabricated object reaches the height of the 3D fabrication object to be manufactured.

Liquid Film Forming Process and Liquid Film Forming Device

The liquid film forming process includes applying an active energy ray curable liquid containing an unsaturated acid monomer and a metal salt to form a liquid film containing the active energy ray curable liquid and is executed by a liquid film forming device.

The active energy ray curable liquid preferably contains a polymerizable monomer.

As the unsaturated acid monomer, metal salt, and polymerizable monomer, the same unsaturated acid monomer, metal salt, and polymerizable monomer as those in the active energy ray curable liquid of the first embodiment can be used.

The liquid film forming device is not particularly limited and can be suitably selected to suit to a particular application. For example, devices employing a spraying method, an inkjet methods, or a dispenser method are suitable. Known devices are suitably used to execute these methods.

Of these, the dispenser method has an excellent quantitative property but the application area is small. The spray method is capable of simply forming a fine discharging material, has a wide application area, and demonstrates excellent applicability but the quantitative property thereof is poor so that powder scatters due to the spray stream. For this reason, in the present disclosure, the inkjet method is particularly preferable. The inkjet method has a good quantitative property in comparison with the spray method and moreover a wider application area in comparison with the dispenser method. Accordingly, the inkjet method is preferable in order to accurately and efficiently form a complex 3D form.

In the case of the inkjet method, the device includes a nozzle capable of discharging the active energy ray curable liquid. As the nozzle, nozzles in a known inkjet printer can be suitably used. For example, it is possible to use GEN4 (manufactured by Ricoh Co. Ltd.) as the inkjet printer. It is preferable to use the inkjet printer because the printer can drip a large amount of the liquid from the head portion at once and the application area is large, which leads to improvement of performance of the application.

Liquid Film Curing Process and Liquid Film Curing Device

The liquid film curing process includes curing a liquid film to cure a layer, and is executed by the liquid film curing device.

The liquid film curing device utilizes heat and active energy rays. Of these, curing with active energy rays is preferable.

Active energy rays are not particularly limited as long as they can apply energy for polymerization reaction of polymerizable components in the active energy ray curable liquid. Specific examples include, but are not limited to, electron beams, α ray, β ray, γ ray, and X ray, in addition to ultraviolet rays. A particularly high energy light source obviates the need for a polymerization initiator to proceed polymerization reaction. In addition, in the case of irradiation of ultraviolet rays, mercury-free is strongly demanded in terms of protection of environment. Therefore, replacement with GaN-based ultraviolet light-emitting devices is greatly preferred from industrial and environmental point of view. Furthermore, ultraviolet ray light-emitting diode (UV-LED) and ultraviolet ray laser diode (UV-LD) are preferable.

Small size, long working life, high efficiency, and high cost performance thereof make such irradiation sources desirable as an ultraviolet light source.

Specific examples of the liquid film curing device include, but are not limited to, an ultraviolet (UV) irradiation lamp and an electron beam. The device to cure the film preferably includes a mechanism to remove ozone.

The ultraviolet ray irradiating lamp includes, for example, a high pressure mercury lamp, an ultra high pressure mercury lamp, and a metal halide lamp.

The ultra high pressure mercury lamp is a point light source but if the DeepUV type combined with an optical system to have a high level of light use efficiency is used, the lamp is capable of emitting light in a short-wavelength range.

Since the metal halide lamp has a wide range of wavelength, it is suitable for colored materials. Halogenated materials of metal such as Pb, Sn, and Fe are used therefor and can be selected to suit to absorption spectrum of a photopolymerization initiator. The lamp for use in curing has no particular limit and can be suitably selected to suit to a particular application. Lamps available on the market such as H lamp, D lamp, or V lamp (manufactured by Fusion System) can be used.

Other Processes and Other Devices

The other optional processes are not particularly limited and can be suitably selected to suit to a particular application. Examples are an input process, a display process, and a control process.

The other optional devices are not particularly limited and can be suitably selected to suit to a particular application. Examples are an input device, a display device, and a control device.

Method of Manufacturing Fabrication Object and Device for Manufacturing Fabrication Object of Second Embodiment The method of manufacturing a fabrication object of the second embodiment repeats a gel film forming process and a gel film curing process, thereby laminating layers to form a fabrication object, and other optional processes.

The method of manufacturing a fabrication object of the second embodiment is suitable for gel fabrication.

As the solvent, water and/or an organic solvent is preferable.

In the method of manufacturing a solid freeform fabrication object of the second embodiment, each process is repeated multiple times. The number of repetitions is the same as in the method of manufacturing a fabrication object of the first embodiment.

Gel Film Forming Process and Gel Film Forming Device

The gel film forming process includes discharging an active energy ray curable liquid containing an unsaturated acid monomer, a metal salt, and a solvent to form a gel film containing the active energy ray curable liquid and is executed by a gel film forming device.

As the gel film forming device, the same device as the liquid film forming device in the device for manufacturing a fabrication object of the first embodiment can be used.

Gel Film Curing Process and Gel Film Curing Device

The gel film curing process includes curing a liquid film to form a layer, and is executed by the gel film curing device.

As the gel film curing device, the same device as the liquid film curing device in the device for manufacturing a fabrication object of the first embodiment can be used.

Other Processes and Other Devices

The other optional processes are not particularly limited and can be suitably selected to suit to a particular application. Examples are an input process, a display process, and a control process.

The other optional devices are not particularly limited and can be suitably selected to suit to a particular application. Examples are an input device, a display device, and a control device.

Method of Manufacturing Fabrication Object and Device for Manufacturing Fabrication Object of Third Embodiment The method of manufacturing a fabrication object of the third embodiment repeats a mixed gel film forming process and a mixed gel film curing process, thereby laminating layers to form a fabrication object, and other optional processes.

In the method of manufacturing a fabrication object of the third embodiment, each process is repeated multiple times. The number of repetitions is the same as in the method of manufacturing a fabrication object of the first embodiment.

Mixed Gel Film Forming Process and Mixed Gel Film Forming Device

The mixed gel film forming process includes discharging a first liquid containing a unsaturated acid monomer and a second liquid containing a metal salt and a solvent onto a substrate to form a mixed gel film and is executed by a mixed gel film forming device.

The first liquid containing an unsaturated acid monomer and the second liquid containing a metal ion are discharged from separate ink jet heads to conduct polymerization reaction on the substrate, thereby obtaining an ion cross-linked cured fabrication object equivalent to the cured fabrication object obtained by curing the active energy ray curable liquid of the second embodiment. Furthermore, the polymerizable monomer may be discharged as a third liquid from another separate inkjet head to form a film together with the first liquid and the second liquid.

As the mixed gel film forming device, the same device as the liquid film forming device in the device for manufacturing a fabrication object of the first embodiment can be used.

Substrate

The form, structure, and size of the substrate is not particularly limited and can be suitably selected to suit to a particular application. For example, the substrate may take a film-like form or a sheet-like form. As the structure, a single layer structure, a laminated structure, etc. can be taken. The size can be suitably selected to suit to a particular application. In addition, the substrate is not limited to a flat form but may have a curved surface or a rough surface.

The material of the substrate is not particularly limited and can be suitably selected to suit to a particular application. For example, a transparent glass substrate, a synthetic resin sheet (film), a metal substrate, a semiconductor, and a ceramic plate can be used. The substrate may be optionally subjected to pre-treatment such as chemical treatment using a silane coupling agent, plasma treatment, ion plating, sputtering, gas phase reaction method, and vacuum deposition.

Examples of the transparent glass substrate include, but are not limited to, white plate glass, blue plate glass, and silica-coated blue plate glass.

As the synthetic resin sheet, for example, polyethylene terephthalate (PET) sheet, polycarbonate sheet, triacetyl cellulose (TAC) sheet, polyether sulfone sheet, polyester sheet, acrylic resin sheet, vinyl chloride resin sheet, aromatic polyamide resin sheet, a polyamide imide sheet, and a polyimide sheet.

Specific examples of the metal substrate include, but are not limited to, an aluminum plate, a copper plate, a nickel plate, and a stainless steel plate.

Specific examples of the ceramic board include, but are not limited to, a silicon board and a quartz board.

Mixed Gel Film Curing Process and Mixed Gel Film Curing Device

The mixed gel film curing process includes curing a mixed gel film to form a layer and is executed by the mixed gel film curing device.

As the mixed gel film curing device, the same device as the liquid film curing device in the device for manufacturing a fabrication object of the first embodiment can be used.

Other Processes and Other Devices

The other optional processes are not particularly limited and can be suitably selected to suit to a particular application. Examples are an input process, a display process, and a control process.

The other optional devices are not particularly limited and can be suitably selected to suit to a particular application. Examples are an input device, a display device, and a control device.

In the present disclosure, active energy ray curable liquid is accommodated in a device for manufacturing a fabrication object. The method of manufacturing a fabrication object of the present disclosure is not particularly limited as long as the active energy ray curable liquid of the present disclosure is used for a device for manufacturing a fabrication object.

The fabrication object manufacturing device of the present disclosure is not particularly limited, but can be a known device. According to the specification of the device, the active energy ray curable liquid of the present disclosure is selected and irradiated with active energy rays to cure the active energy ray curable liquid, thereby fabricating a fabrication object.

Resin Fabrication Object

The resin fabrication object of the present disclosure is fabricated by the method of manufacturing a fabrication object of the first embodiment of the present disclosure.

Since the resin fabrication object of the present disclosure has excellent breaking stress and elongation ratio, for example, if a fabrication object having a gear-like form is fabricated and actually incorporated into a device as a gear, the fabrication object does not chip.

Gel Fabrication Object

The gel fabrication object of the present disclosure is fabricated by the method of manufacturing a fabrication object of the second embodiment and the third embodiment of the present disclosure.

Since the gel fabrication object of the present disclosure has excellent breaking stress and elongation ratio, it is possible to fabricate an organ model having a strong portion such as a heart and to make texture and sharpness thereof closer to those of a real organ.

Hereinafter, a material jetting method fabrication device (an example of a fabrication object manufacturing device) suitably used in the method of manufacturing a fabrication object of the present disclosure is described. Hereinafter, the fabrication object manufacturing device using an active energy ray curable liquid as a model material is described. However, the device for manufacturing a fabrication object of the present disclosure is not limited thereto.

The accompanying drawing is a schematic diagram illustrating an example of the method for manufacturing a fabrication object of the present disclosure. A fabrication object manufacturing device 30 of the accompanying drawing includes head units 31 and 32, an ultraviolet irradiator 33, a roller 34, a carriage 35, and a stage 37.

The head unit 31 discharges a model material 1 as the active energy ray curable liquid of the present disclosure. The head unit 32 discharges a support material 2. The support material is not particularly limited and can be appropriately selected from known active energy ray curable liquids.

The ultraviolet irradiator 33 irradiates the model material 1 discharged and the support material 2 discharged to cure the model material 1 and the support material 2.

The rollers 34 smooths the liquid films of the model material 1 and the support material 2.

The carriage 35 reciprocates the respective units such as the head units 31 and 32 in the X direction in the accompanying drawing.

The stage 37 moves a substrate 36 in the Z direction indicated in the accompanying drawing and the Y direction, i.e., the depth direction in the accompanying drawing.

When the model material 1 is present for each color, the fabrication object manufacturing device 30 may include a plurality of the head units 31 to discharge the model material for each color. The fabrication object manufacturing device 30 includes a plurality of head units 32 to discharge the support material 2.

As the nozzle for the head units 31 and 32, nozzles for use in a known inkjet printer can be suitably used. Specific examples of the inkjet printer include, but are not limited to, MH5420/5440, manufactured by Ricoh Co. Ltd. It is preferable to use the inkjet printer because the printer can drip a large amount of the liquid from the head portion at once and the application area is large, which leads to improvement of performance of the application.

When the roller 34 is used, the fabrication object manufacturing device 30 laminates layers in accordance with the number of lamination while lowering the stage 37 in order to keep the gap between the roller 34 and the fabrication surface constant. The roller 34 is preferably configured to be adjacent to the ultraviolet irradiator 33. Further, it is preferable that the rotation direction of the roller 34 be opposite to the travel direction of the head units 31 and 32.

Further, in order to prevent the ink from drying during downtime, the fabrication object manufacturing device 30 may include a device such as a cap for the nozzles of the head units 31 and 32. Moreover, in order to prevent the clogging of the nozzle during continuous use for a long time, the fabrication object manufacturing device 30 may include a maintenance mechanism to maintain the head.

The ultraviolet irradiator 33 for use in curing the modeling material 1 and the support material 2 is not particularly limited and can be suitably selected to suit to a particular application.

Specific examples include, but are not limited to, a high pressure mercury lamp, an ultra-high pressure mercury lamp, an LED, and a metal halide. The ultra-high pressure mercury lamp is a point light source but if the DeepUV type combined with an optical system to have a high level of light use efficiency is used, the lamp is capable of emitting light in a short-wavelength range. Since the metal halide is selected in accordance with the absorption spectrum of a photopolymerization initiator because the metal halide has a wide wavelength range. Specific examples of the ultraviolet irradiator 33 include, but are not limited to, commercially available articles such as an H lamp, a D lamp, or a V lamp, manufactured by Fusion System.

The engine of the fabrication object manufacturing device 30 moves the ultraviolet irradiator 33 by the carriage 35 to irradiate the liquid film with ultraviolet rays in accordance with the wavelength of the photopolymerization initiator contained in the active energy ray curable liquid of the model material 1. As a result, the fabrication object manufacturing device 30 cures the liquid film to form a layer.

After forming the bottommost layer, the engine of the fabrication object manufacturing device 30 lowers the stage by an amount of the layer. The engine of the fabrication object manufacturing device 30 discharges liquid droplets of the model material 1 based on two-dimensional image data while moving the carriage 35 or the stage 37. The discharging method is the same as that for forming the bottommost liquid film. As a result, a liquid film having a cross-section corresponding to the two-dimensional data for the second bottommost layer is formed on the bottommost layer. Furthermore, the engine of the fabrication object manufacturing device 30 moves the ultraviolet irradiator 33 by the carriage 35 to irradiate the liquid film with ultraviolet rays, thereby curing the liquid film to form the second bottommost layer on the bottommost layer.

The engine of the fabrication object manufacturing device 30 repeats forming and curing liquid films to stack layers in the same manner as described above based on the input two-dimensional data in the order from the bottom. The number of repetitions varies depending on, for example, the number of input two-dimensional image data, or the height and the form of a three-dimensional model. When fabrication using all the two-dimensional image data is complete, the fabrication corresponding to a model portion is obtained.

A support material may be used in the case in which an overhang or internal hollow structure is included as the form of a fabrication object. The support material is discharged from a head separated from the model material ink head to have a structure in which an overhang or hollow structure is filled in the same manner as the model material film formation.

The support portion is removed from the fabrication object after fabrication. Removal methods include physical removal or chemical removal. For physical removal, mechanical force is applied to a fabrication object to peel off the support portion from the model portion.

Chemical removal is preferable when the model portion is a soft fabrication object easily broken or cracked by a mechanical force. For a fabrication object including the model portion and the support portion, the support portion is dissolved in a solvent or flown out and removed in a liquid state utilizing a phase transition in the chemical removal. In the method of dissolving in a solvent, a water-soluble polymer is used as a support material. Due to this, when a fabrication object including a support portion is immersed in water, the support portion containing the water-soluble polymer is dissolved. This method involves immersion of the fabrication object in water for a long time so that the model portion may swell if it is a soft fabrication object.

In the case where the support portion is a material that is dissolved in an organic solvent, an organic solvent may be used as the solution. In the method of dissolving in an organic solvent, a polymer soluble in the organic solvent is used as a support material. Due to this, when a fabrication object including a support portion is immersed in water, the support portion containing the organic solvent-soluble polymer is dissolved. According to this method, since the fabrication object is immersed in the organic solvent for a long time, the model portion may be deformed if reactivity to the organic solvent is maintained.

In the method using the phase transition, a material such as wax is used as a support material. The material such as wax is in a solid state at normal temperature, but melts and turns into liquid when heated. This method is preferable in that no stress other than thermal energy is applied to the model material. However, when the model material is a soft fabrication object, the melting point of the wax of the support material is preferably 60 degrees C. or less in order to prevent deformation by heat.

In order to heat, melt, and remove a material demonstrating phase transition property, the entire fabrication object is heated by a hot plate, an oven having a sealed structure, hot air, etc., in a temperature range of from 20 to 100 degrees C. According to the application of the thermal energy, the support structure collapses, thereby facilitating removal. However, just heating and melting leaves residue, which adheres to the fabrication object. That is, the residue is not completely removed. Therefore, it is preferable to immerse in an organic solvent and remove the residue.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Resin Fabrication

Examples and Comparative Examples of resin fabrication are described. Active energy ray curable liquids for resin fabrication are mainly used for industrial members and simple prototypes. If the elongation ratio is small, a cured product of the fabrication object is easily broken when bent. Therefore, a larger elongation ratio is more preferable. Also, as the breaking stress increases, the fabrication object becomes tough.

Example 1

Preparation of Active Energy Ray Curable Liquid 15 parts of potassium acrylate (manufactured by Asada Chemical INDUSTRY Co., Ltd.), 83 parts of acryloyl morpholine (manufactured by KJ Chemicals Corporation), and 2 parts of 1-hydroxycyclohexyl phenyl ketone (IRGACURE® 184, manufactured by BASF SE) were stirred and impurities, etc. were removed by filtration. Thereafter, the resultant was subjected to vacuum degassing for 10 minutes to obtain an active energy ray curable liquid as a homogeneous liquid.

3D Fabrication

The fabrication object manufacturing device 30 illustrated in the accompanying drawing discharged the thus-prepared active energy ray curable liquid onto a stage based on the test pattern (dumbbell-like form No. 3, according to JIS K 6251 format) to form a liquid film.

The ultraviolet irradiator 33 (SPOT CURE SP5-250 DB, manufactured by USHIO INC.) irradiated the liquid film in a light quantity of 350 mJ/cm$^2$ to cure it. Thereafter, the layer as a cured film was subjected to smoothing treatment by the roller 34. As the roller 34, a metal roller made of an aluminum alloy having a diameter of 25 mm with an anodized surface was used. The above-described discharging and curing processes were repeated, and the smoothed layers were stacked layer by layer as an inkjet film, to produce a dumbbell-like form No. 3 resin fabrication object having a thickness of 1 mm.

Example 2

A dumbbell-like form No. 3 resin fabrication object having a thickness of 1 mm was obtained in the same manner as in Example 1 except that 15 parts of zinc acrylate (manufactured by Asada Chemical INDUSTRY Co., Ltd.), 83 parts of acryloyl morpholine (manufactured by KJ Chemicals Corporation), and 2 parts of 1-hydroxycyclohexyl phenyl ketone (IRGACURE® 184, manufactured by BASF SE) were stirred and impurities were removed by filtration and the resultant was subjected to vacuum degassing for 10 minutes to obtain an active energy ray curable liquid as a homogeneous liquid.

Example 3

A dumbbell-like form No. 3 resin fabrication object having a thickness of 1 mm was obtained in the same manner as in Example 1 except that 15 parts of neodymium acrylate (manufactured by Asada Chemical INDUSTRY Co., Ltd.), 83 parts of acryloyl morpholine (manufactured by KJ Chemicals Corporation), and 2 parts of 1-hydroxycyclohexyl phenyl ketone (IRGACURE® 184, manufactured by BASF SE) were stirred and impurities were removed by filtration and the resultant was subjected to vacuum degassing for 10 minutes to obtain an active energy ray curable liquid as a homogeneous liquid.

Example 4

A dumbbell-like form No. 3 resin fabrication object having a thickness of 1 mm was obtained in the same manner as in Example 1 except that 15 parts of zinc acrylate (manufactured by Asada Chemical INDUSTRY Co., Ltd.), 83 parts of dimethyl acrylamide (manufactured by KJ Chemicals Corporation), and 2 parts of 1-hydroxycyclohexyl phenyl ketone (IRGACURE® 184, manufactured by BASF SE) were stirred and impurities were removed by filtration and the resultant was subjected to vacuum degassing for 10 minutes to obtain an active energy ray curable liquid as a homogeneous liquid.

Example 5

A dumbbell-like form No. 3 resin fabrication object having a thickness of 1 mm was obtained in the same manner as in Example 1 except that 5 parts of zinc acrylate (manufactured by Asada Chemical INDUSTRY Co., Ltd.), 93 parts of acryloyl morpholine (manufactured by KJ Chemicals Corporation), and 2 parts of 1-hydroxycyclohexyl phenyl ketone (IRGACURE® 184, manufactured by BASF SE) were stirred and impurities were removed by filtration and the resultant was subjected to vacuum degassing for 10 minutes to obtain an active energy ray curable liquid as a homogeneous liquid.

Example 6

A dumbbell-like form No. 3 resin fabrication object having a thickness of 1 mm was obtained in the same manner as in Example 1 except that 30 parts of zinc acrylate (manufactured by Asada Chemical INDUSTRY Co., Ltd.), 68 parts of acryloyl morpholine (manufactured by KJ Chemicals Corporation), and 2 parts of 1-hydroxycyclohexyl phenyl ketone (IRGACURE® 184, manufactured by BASF SE) were stirred and impurities were removed by filtration and the resultant was subjected to vacuum degassing for 10 minutes to obtain an active energy ray curable liquid as a homogeneous liquid.

Example 7

A dumbbell-like form No. 3 resin fabrication object having a thickness of 1 mm was obtained in the same manner as in Example 1 except that 50 parts of zinc acrylate (manufactured by Asada Chemical INDUSTRY Co., Ltd.), 48 parts of acryloyl morpholine (manufactured by KJ Chemicals Corporation), and 2 parts of 1-hydroxycyclohexyl phenyl ketone (IRGACURE® 184, manufactured by BASF SE) were stirred and impurities were removed by filtration and the resultant was subjected to vacuum degassing for 10 minutes to obtain an active energy ray curable liquid as a homogeneous liquid.

Example 8

A dumbbell-like form No. 3 resin fabrication object having a thickness of 1 mm was obtained in the same manner as in Example 1 except that 94 parts of acrylic acid (manufactured by Tokyo Chemical Industry Co. Ltd.), 4 parts of iron chloride (II) tetrahydrate (manufactured by FUJIFILM Wako Pure Chemical Corporation), and 2 parts of 1-hydroxycyclohexyl phenyl ketone (IRGACURE® 184, manufactured by BASF SE) were stirred and impurities were removed by filtration and the resultant was subjected to vacuum degassing for 10 minutes to obtain an active energy ray curable liquid as a homogeneous liquid.

Example 9

A dumbbell-like form No. 3 resin fabrication object having a thickness of 1 mm was obtained in the same manner as in Example 1 except that 10 parts of acrylic acid (manufactured by Tokyo Chemical Industry Co. Ltd.), 4 parts of iron chloride (II) tetrahydrate (manufactured by FUJIFILM Wako Pure Chemical Corporation), 84 parts of acryloylmorpholine (manufactured by KJ Chemicals Corporation), and 2 parts of 1-hydroxycyclohexyl phenyl ketone (IRGACURE® 184, manufactured by BASF SE) were stirred and impurities were removed by filtration and the resultant was subjected to vacuum degassing for 10 minutes to obtain an active energy ray curable liquid as a homogeneous liquid.

Comparative Example 1

A dumbbell-like form No. 3 resin fabrication object having a thickness of 1 mm was obtained in the same manner as in Example 1 except that 15 parts of acrylic acid (manufactured by Tokyo Chemical Industry Co. Ltd.), 83 parts of acryloyl morpholine (manufactured by KJ Chemicals Corporation), and 2 parts of 1-hydroxycyclohexyl phenyl ketone (IRGACURE® 184, manufactured by BASF SE) were stirred and impurities were removed by filtration and the resultant was subjected to vacuum degassing for 10 minutes to obtain an active energy ray curable liquid as a homogeneous liquid.

Next, with respect to the dumbbell-like form No. 3 fabrication objects obtained in Examples 1 to 9 and Comparative Example 1, the breaking stress and the elongation ratio were evaluated in the following manner. The results are shown in Tables 1-1 and 1-2.

Evaluation on Breaking Stress

Each dumbbell-like form No. 3 fabrication object was subjected to a tensile test at a tensile speed of 500 mm/min with a tensile tester (AG-10 kNX, manufactured by Shimadzu Corporation) according to JIS K 6251 format. The stress at breaking in the tensile test was determined as the breaking stress.

Evaluation on Elongation Ratio

Each dumbbell-like form No. 3 fabrication object was subjected to a tensile test at a tensile speed of 500 mm/min with a tensile tester (AG-10 kNX, manufactured by Shimadzu Corporation) according to JIS K 6251 format. Based on the change of gauge length in the tensile test, the elongation ratio was calculated.

TABLE 1-1

| | | Example | | | | | | | |
|---|---|---|---|---|---|---|---|---|---|
| | | 1 | 2 | 3 | 4 | 5 | 6 | 7 | 8 |
| Formulation | Zinc acrylate | | 15 | | 15 | 5 | 30 | 50 | |
| | Neodymium acrylate | | | 15 | | | | | |
| | Potassium acrylate | 15 | | | | | | | |
| | Acrylic acid | | | | | | | | 94 |
| | Iron (II) chloride tetrahydrate | | | | | | | | 4 |
| | Acryloylmorpholine | 83 | 83 | 83 | | 93 | 68 | 48 | |
| | Dimethyl acrylamide | | | | 83 | | | | |
| | 1-hydroxycyclohexyl phenyl ketone | 2 | 2 | 2 | 2 | 2 | 2 | 2 | 2 |
| | Total (parts) | 100 | 100 | 100 | 100 | 100 | 100 | 100 | 100 |
| Evaluation result | Breaking stress (MPa) | 1.9 | 3.4 | 5.1 | 2.5 | 2.6 | 3.0 | 4.8 | 2.3 |
| | Elongation ratio (percent) | 9 | 20 | 28 | 37 | 22 | 31 | 40 | 12 |

TABLE 1-2

| | | Example 9 | Comparative Example 1 |
|---|---|---|---|
| Formulation | Zinc acrylate | | |
| | Neodymium acrylate | | |
| | Potassium acrylate | | |
| | Acrylic acid | 10 | 15 |
| | Iron (II) chloride tetrahydrate | 4 | |
| | Acryloylmorpholine | 84 | 83 |
| | Dimethyl acrylamide | | |
| | 1-hydroxycyclohexyl phenyl ketone | 2 | 2 |
| | Total (parts) | 100 | 100 |
| | Breaking stress (MPa) | 3.5 | 1.4 |
| Evaluation result | Elongation ratio (percent) | 20 | 5 |

As seen in the results shown in Tables 1-1 and 1-2, Examples 1 to 9 in which the ion cross-linked structure is formed to have a strong breaking stress and a high elongation ratio in comparison with Comparative Example 1 in which the ion cross-linked structure is not formed.

In each of Examples 1 to 9, as the cationic metal ion has a larger valence, a tough fabrication object having a strong breaking stress and a high elongation ratio was obtained. This is considered to be because as the valence of the metal ion increases, the ion cross-linking density becomes high. Moreover, the fabrication object of Comparative Example 1 in which the ion cross-linked structure was not present turned out to be very fragile.

Gel Fabrication

Examples of gel fabrication are described. The gel material is a fabrication object containing a solvent in a cured product. When the solvent is water, it is called "hydrogel" and when the solvent is an organic solvent, it is called "oil gel". The gel fabrication object is soft and has an extremely high elongation ratio as compared with ordinary resin fabrication object. The gel fabrication is used to form a soft fabrication object resembling a buffer material or a human body.

Example 10

A dumbbell-like form No. 3 hydrogel fabrication object having a thickness of 1 mm was obtained in the same manner as in Example 1 except that 15 parts of zinc acrylate (manufactured by Asada Chemical INDUSTRY Co., Ltd.), 83 parts of water, and 2 parts of 1-hydroxycyclohexyl phenyl ketone (IRGACURE® 184, manufactured by BASF SE) were stirred and impurities were removed by filtration and the resultant was subjected to vacuum degassing for 10 minutes to obtain an active energy ray curable liquid as a homogeneous liquid.

Example 11

A dumbbell-like form No. 3 oil gel fabrication object having a thickness of 1 mm was obtained in the same manner as in Example 1 except that 15 parts of zinc acrylate (manufactured by Asada Chemical INDUSTRY Co., Ltd.), 83 parts of ethylene glycol (manufactured by Tokyo Chemical Industry Co. Ltd.), and 2 parts of 1-hydroxycyclohexyl phenyl ketone (IRGACURE® 184, manufactured by BASF SE) were stirred and impurities were removed by filtration and the resultant was subjected to vacuum degassing for 10 minutes to obtain an active energy ray curable liquid as a homogeneous liquid.

Example 12

As the first liquid, 90 parts of acrylic acid (manufactured by Tokyo Chemical Industry Co., Ltd.) as an unsaturated acid monomer and 10 parts of 1-hydroxycyclohexyl phenyl ketone (IRGACURE® 184, manufactured by BASF SE) were stirred to prepare liquid.

As the second liquid, 95 parts of water and 5 parts of iron chloride (II) tetrahydrate (manufactured by FUJIFILM Wako Pure Chemical Corporation) were stirred to prepare a liquid. The first liquid and the second liquid were filtered to remove impurities followed by vacuum degassing for 10 minutes.

3D Fabrication

The first liquid and the second liquid were discharged from separate inkjet heads according to the test pattern (in accordance with JIS K 6251 format, dumbbell-like form No. 3) using the fabrication object manufacturing device 30 illustrated in the accompanying drawing.

Thereafter, the ultraviolet irradiator 33 (SPOT CURE SP5-250DB, manufactured by USHIO INC.) irradiated the liquid film in a light quantity of 350 mJ/cm$^2$ to cure it. Thereafter, the layer as a cured film was subjected to smoothing treatment by the roller 34. As the roller 34, a metal roller made of an aluminum alloy having a diameter of 25 mm with an anodized surface was used.

The discharging and curing processes were repeated, and the smoothed layers were stacked layer by layer as an inkjet film, to produce a dumbbell-like form No. 3 hydrogel fabrication object having a thickness of 1 mm.

Example 13

As the first liquid, 45 parts of acrylic acid (manufactured by Tokyo Chemical Industry Co., Ltd.) as an unsaturated acid monomer, 10 parts of 1-hydroxycyclohexyl phenyl ketone (IRGACURE® 184, manufactured by BASF SE), and 45 parts of acryloylmorpholine (manufactured by KJ Chemicals Corporation) as a polymerizable monomer to prepare liquid.

As the second liquid, 95 parts of water and 5 parts of iron chloride (11) tetrahydrate (manufactured by FUJIFILM Wako Pure Chemical Corporation) were stirred to prepare a liquid. The first liquid and the second liquid were filtered to remove impurities followed by vacuum degassing for 10 minutes.

3D Fabrication

The first liquid and the second liquid were discharged from separate inkjet heads according to the test pattern (in accordance with JIS K 6251 format, dumbbell-like form No. 3) using the fabrication object manufacturing device 30 illustrated in the accompanying drawing.

Thereafter, the ultraviolet irradiator 33 (SPOT CURE SP5-250DB, manufactured by USHIO INC.) irradiated the liquid film in a light quantity of 350 mJ/cm$^2$ to cure it. Thereafter, the layer as a cured film was subjected to smoothing treatment by the roller 34. As the roller 34, a metal roller made of an aluminum alloy having a diameter of 25 mm with an anodized surface was used.

The discharging and curing processes were repeated, and the smoothed layers were stacked layer by layer as an inkjet film, to produce a dumbbell-like form No. 3 hydrogel fabrication object having a thickness of 1 mm.

Example 14

A dumbbell-like form No. 3 hydrogel fabrication object having a thickness of 1 mm was obtained in the same manner as in Example 1 except that 15 parts of zinc acrylate (manufactured by Asada Chemical INDUSTRY Co., Ltd.), 63 parts of water, 20 parts of acryloyl morpholine (manufactured by KJ Chemicals Corporation), and 2 parts of 1-hydroxycyclohexyl phenyl ketone (IRGACURE® 184, manufactured by BASF SE) were stirred and impurities were removed by filtration and the resultant was subjected to vacuum degassing for 10 minutes to obtain an active energy ray curable liquid as a homogeneous liquid.

Example 15

A dumbbell-like form No. 3 hydrogel fabrication object having a thickness of 1 mm was obtained in the same manner as in Example 1 except that 5 parts of zinc acrylate (manufactured by Asada Chemical INDUSTRY Co., Ltd.), 93 parts of water, and 2 parts of 1-hydroxycyclohexyl phenyl ketone (IRGACURE® 184, manufactured by BASF SE) were stirred and impurities were removed by filtration and the resultant was subjected to vacuum degassing for 10 minutes to obtain an active energy ray curable liquid as a homogeneous liquid.

Example 16

A dumbbell-like form No. 3 hydrogel fabrication object having a thickness of 1 mm was obtained in the same manner as in Example 1 except that 30 parts of zinc acrylate (manufactured by Asada Chemical INDUSTRY Co., Ltd.), 68 parts of water, and 2 parts of 1-hydroxycyclohexyl phenyl ketone (IRGACURE® 184, manufactured by BASF SE) were stirred and impurities were removed by filtration and the resultant was subjected to vacuum degassing for 10 minutes to obtain an active energy ray curable liquid as a homogeneous liquid.

Example 17

A dumbbell-like form No. 3 hydrogel fabrication object having a thickness of 1 mm was obtained in the same manner as in Example 1 except that 50 parts of zinc acrylate (manufactured by Asada Chemical INDUSTRY Co., Ltd.), 48 parts of water, and 2 parts of 1-hydroxycyclohexyl phenyl ketone (IRGACURE® 184, manufactured by BASF SE) were stirred and impurities were removed by filtration and the resultant was subjected to vacuum degassing for 10 minutes to obtain an active energy ray curable liquid as a homogeneous liquid.

Comparative Example 2

A dumbbell-like form No. 3 hydrogel fabrication object having a thickness of 1 mm was obtained in the same manner as in Example 1 except that 15 parts of acrylic acid (manufactured by Tokyo Chemical Industry Co. Ltd.), 83 parts of water, and 2 parts of 1-hydroxycyclohexyl phenyl ketone (IRGACURE® 184, manufactured by BASF SE) were stirred and impurities were removed by filtration and the resultant was subjected to vacuum degassing for 10 minutes to obtain an active energy ray curable liquid as a homogeneous liquid.

Comparative Example 3

A dumbbell-like form No. 3 oil gel fabrication object having a thickness of 1 mm was obtained in the same manner as in Example 1 except that 15 parts of acrylic acid (manufactured by Tokyo Chemical Industry Co. Ltd.), 83 parts of ethylene glycol (manufactured by Tokyo Chemical Industry Co. Ltd.), and 2 parts of 1-hydroxycyclohexyl phenyl ketone (IRGACURE® 184, manufactured by BASF SE) were stirred and impurities were removed by filtration and the resultant was subjected to vacuum degassing for 10 minutes to obtain an active energy ray curable liquid as a homogeneous liquid.

Comparative Example 4

As the first liquid, 90 parts of acrylic acid (manufactured by Tokyo Chemical Industry Co., Ltd.) as an unsaturated acid monomer and 10 parts of 1-hydroxycyclohexyl phenyl ketone (IRGACURE® 184, manufactured by BASF SE) were stirred to prepare liquid. 100 parts of water was prepared as the second liquid. Dumbbell-like form No. 3 hydrogel fabrication object having a thickness of 1 mm in the same manner as in Example 12 except that the first liquid and the second liquid were subjected to filtration to remove impurities, followed by vacuum degassing for 10 minutes.

Next, with respect to the dumbbell-like form No. 3 fabrication objects obtained in Examples 10 to 17 and Comparative Examples 2 to 4, the breaking stress and the elongation ratio were evaluated in the same manner as in Examples 1 to 9 and Comparative Example 1. The results are shown in Tables 2-1 and 2-2.

TABLE 2-1

|  |  | Example | | | | | | | |
|---|---|---|---|---|---|---|---|---|---|
|  |  | 10 | 11 | 12 | 13 | 14 | 15 | 16 | 17 |
| Formulation | Zinc acrylate | 15 | 15 |  |  | 15 | 5 | 30 | 50 |
|  | Acrylic acid |  |  |  |  |  |  |  |  |
|  | Water | 83 |  |  |  | 63 | 93 | 68 | 48 |
|  | Ethylene glycol |  |  | 83 |  |  |  |  |  |
|  | Acryloylmorpholine |  |  |  |  | 20 |  |  |  |
|  | 1-hydroxycyclohexyl phenyl ketone | 2 | 2 |  |  | 2 | 2 | 2 | 2 |
|  | Total (parts) | 100 | 100 |  |  | 100 | 100 | 100 | 100 |
| Evaluation result | Breaking stress (MPa) | 1.5 | 1.8 | 1.3 | 2.1 | 2.3 | 0.8 | 2.5 | 4.8 |
|  | Elongation ratio (percent) | 2050 | 2210 | 1900 | 1701 | 1810 | 1100 | 1833 | 1330 |

TABLE 2-2

|  |  | Comparative Example | | |
|---|---|---|---|---|
|  |  | 2 | 3 | 4 |
| Formulation | Zinc acrylate |  |  |  |
|  | Acrylic acid | 15 | 15 |  |
|  | Water | 83 |  |  |
|  | Ethylene glycol |  | 83 |  |
|  | Acryloylmorpholine |  |  |  |
|  | 1-hydroxy cyclohexyl phenyl ketone | 2 | 2 |  |
|  | Total (parts) | 100 | 100 |  |
| Evaluation result | Breaking stress (MPa) | 0.3 | 0.5 | 0.2 |
|  | Elongation ratio (percent) | 3 | 10 | 0.4 |

As seen in the results of Tables 2-1 and 2-2, Example 10, which was a hydrogel fabrication object, had an extremely tough and high elongation ratio. In Comparative Example 2, the gel material was a typical material having no ion cross-linked structure so that the elongation ratio and the breaking stress were both extremely low.

Also, in Examples 12 and 13 in which the unsaturated acid monomer and the metal ion were separately discharged, high strength gel materials having the same toughness as in Example 10 were obtained. However, in Comparative Example 4, the gel material was a typical material having no ion cross-linked structure so that the elongation ratio and the breaking stress were both extremely low.

Like the hydrogel, Example 11 was an oil gel having an extremely toughness and high elongation ratio. In Comparative Example 3, the oil gel material was a typical material having no ion cross-linked structure so that the elongation ratio and the breaking stress were both extremely low.

Aspects of the present disclosure are, for example, as follows.

1. Active energy ray curable liquid contains an unsaturated acid monomer and a metal salt.

2. The active energy ray curable liquid according to 1 mentioned above further contains a polymerizable monomer.

3. An active energy ray curable liquid contains an unsaturated acid monomer, a metal salt, and a solvent.

4. The active energy ray curable liquid according to 3 mentioned above, wherein the solvent contains water and/or an organic solvent.

5. The active energy ray curable liquid according to any one of 1 to 4 mentioned above further contains a unsaturated acid metal salt monomer having an ion cross-linking structure formed by the unsaturated acid monomer and the metal salt.

6. The active energy ray curable liquid according to any one of 1 to 5 mentioned above, wherein the unsaturated acid monomer contains (meth)acrylic acid and/or a derivative thereof.

7. The active energy ray curable liquid according to any one of 1 to 6 mentioned above, wherein the metal salt comprises a multivalent metal salt.

8. The active energy ray curable liquid according to any one of 1 to 7 mentioned above, further contains a polymerizable initiator.

9. The active energy ray curable liquid according to any one of 1 to 8 mentioned above for forming a fabrication object.

10. An active energy ray curable liquid set contains a first liquid containing a unsaturated acid monomer and a second liquid containing a metal salt and a solvent.

11. The active energy ray curable liquid set according to 10 mentioned above, wherein the solvent contains water and/or an organic solvent.

12. The active energy ray curable liquid set according to 10 or 11 mentioned above, wherein the unsaturated acid monomer contains (meth)acrylic acid and/or a derivative thereof.

13. The active energy ray curable liquid set according to any one of 10 to 12, wherein the metal salt contains a multivalent metal salt.

14. The active energy ray curable liquid set according to any one of 10 to 13, for fabricating a fabrication object.

15. A method of manufacturing a fabrication object contains discharging an active energy ray curable liquid containing an unsaturated acid monomer and a metal salt, forming a liquid film containing the active energy ray curable liquid, curing the liquid film to form a layer, and repeating the discharging, the forming, and the curing to laminate the layers to form the fabrication object.

16. The method according to 15 mentioned above, wherein the active energy ray curable liquid further contains a polymerizable monomer.

17. The method of manufacturing a fabrication object according to 15 or 16, wherein the active energy ray curable liquid is applied by an inkjet method.

18. A method of manufacturing a fabrication object includes applying an active energy ray curable liquid containing an unsaturated acid monomer, a metal salt, and a solvent, forming a gel film containing the active energy ray curable liquid, curing the gel film to form a layer, and repeating the applying, the forming, and the curing to laminate the layers to form the fabrication object.

19. The method of manufacturing a fabrication object according to 18 mentioned above, wherein the solvent contains water and/or an organic solvent.

20. The method of manufacturing a fabrication object according to 18 or 19 mentioned above, wherein the active energy ray curable liquid is applied by an inkjet method.

21. A method of manufacturing a fabrication object includes discharging a first liquid containing an unsaturated acid monomer and a second liquid containing a metal salt and a solvent, forming a mixed gel film, curing the mixed gel film to cure the mixed gel film and form a layer, and repeating the applying, the forming, and the curing to laminate the layers to form the fabrication object.

22. The method of manufacturing a fabrication object according to 21 mentioned above, wherein the solvent contains water and/or an organic solvent.

23. The method of manufacturing a fabrication object according to 21 or 22 mentioned above, wherein the first liquid and the second liquid are applied by an inkjet method.

24. A device for manufacturing a fabrication object includes a liquid film forming device to discharge an active energy ray curable liquid containing an unsaturated acid monomer and a metal salt to form a liquid film and a liquid film curing device to cure the liquid film and form a layer to laminate the layers to form the fabrication object.

25. The device for manufacturing a fabrication object according to 24 mentioned above, wherein the active energy ray curable liquid further contains a polymerizable monomer.

26. A device for manufacturing a fabrication object includes a liquid film forming device to discharge an active energy ray curable liquid containing an unsaturated acid monomer, a metal salt, and a solvent to form a gel film and a gel film curing device to cure the gel film and form a layer to laminate the layers to form the fabrication object.

27. The device for manufacturing a fabrication object according to 26 mentioned above, wherein the solvent contains water and/or an organic solvent.

28. A device for manufacturing a fabrication object includes a mixed gel film forming device to discharge a first liquid containing an unsaturated acid monomer and a second liquid containing a metal salt and a solvent onto a substrate and form a mixed gel film and a mixed gel film curing device to cure the mixed gel film and form a layer to laminate the layers to form the fabrication object.

29. The device for manufacturing a fabrication object according to 28 mentioned above, wherein the solvent contains water and/or an organic solvent.

30. A resin fabrication object produced by the method of manufacturing a fabrication object according to any one of 15 to 17 mentioned above.

31. A gel fabrication object produced by the method of manufacturing a fabrication object according to any one of 18 to 23 mentioned above.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A hydrogel precursor liquid, comprising:
48 to 93 percent by mass water, and
5 to 15 percent by mass of unsaturated acid metal salt monomer, wherein the unsaturated acid metal salt monomer is other than calcium acrylate, and
wherein the hydrogel precursor liquid has a viscosity of from 6 to 30 mPa·s at 25 degrees C.

2. The hydrogel precursor liquid according to claim 1, further comprising a polymerizable monomer.

3. The hydrogel precursor liquid according to claim 1, further comprising an organic solvent.

4. The hydrogel precursor liquid according to claim 1, wherein the unsaturated acid metal salt monomer has an ion cross-linked structure formed by an unsaturated acid monomer and a metal salt.

5. The hydrogel precursor liquid according to claim 4, wherein the unsaturated acid monomer comprises at least one of acrylic acid, a derivative of acrylic acid, methacrylic acid, and a derivative of methacrylic acid.

6. The hydrogel precursor liquid according to claim 4, wherein the metal salt comprises a multi-valent metal salt.

7. The hydrogel precursor liquid according to claim 1, which is suitable for fabricating a fabrication object.

8. A method of manufacturing a fabrication object comprising:
applying the hydrogel precursor liquid according to claim 1 to form a liquid film comprising the liquid;
curing the liquid film to form a layer;
repeating the applying and the curing to laminate the layer to form the fabrication object.

9. The method according to claim 8, wherein the liquid further comprises a polymerizable monomer.

10. A resin fabrication object produced by the method according to claim 8.

11. The hydrogel precursor liquid according to claim 1, comprising: 83 to 93 by mass water.

12. The hydrogel precursor liquid according to claim 1, wherein the unsaturated acid metal salt monomer is obtained by reacting an unsaturated acid monomer with a metal ion obtained by ionizing a metal salt.

13. The hydrogel precursor liquid according to claim 1, wherein the unsaturated acid metal salt monomer is not copolymerized with a polymerizable monomer.

14. The hydrogel precursor liquid according to claim 1, wherein the unsaturated acid metal salt monomer is copolymerized with a polymerizable monomer.

15. The hydrogel precursor liquid according to claim 1, wherein the unsaturated acid metal salt monomer comprises zinc acrylate.

16. The hydrogel precursor liquid according to claim 15, further comprising acryloyl morpholine as a polymerizable monomer.

17. The hydrogel precursor liquid according to claim 1, wherein the metal salt comprises a multivalent salt of nickel, iron, copper, manganese, cobalt, zinc, cadmium, beryllium, aluminum, gallium, neodymium, gadolinium, or cerium.

18. The hydrogel precursor liquid according to claim 1, wherein the salt is a multivalent salt, and the metal of the salt is a transition metal, base metal, or lanthanoid metal.

19. The hydrogel precursor liquid according to claim 1, which is suitable for ink jet fabrication.

20. The hydrogel precursor liquid according to claim 1, wherein the unsaturated acid metal salt monomer is other than potassium acrylate, calcium acrylate, or magnesium acrylate.

21. The hydrogel precursor liquid according to claim 2, wherein the polymerizable monomer is acryloyl morpholine.

22. The hydrogel precursor liquid according to claim 2, wherein the polymerizable monomer comprises a (meth) acrylamide derivative.

23. The hydrogel precursor liquid according to claim 2, wherein a content of the polymerizable monomer is from 10 to 47 percent by mass of the hydrogel precursor liquid.

24. A hydrogel precursor liquid, comprising:
(i) 48 to 93 percent by mass water, and
(ii) an unsaturated acid monomer and a metal salt, which react to form an unsaturated acid metal salt monomer which is present in the precursor liquid in an amount of 5 to 15 percent by mass thereof, and
wherein the hydrogel precursor liquid has a viscosity of from 6 to 30 mP·s at 25 degrees C.

25. The hydrogel precursor liquid according to claim 24, comprising 83 to 93 by mass water.

* * * * *